W. V. TURNER.
STRAIGHT AIR EMERGENCY BRAKE.
APPLICATION FILED FEB. 17, 1915.
1,228,498.
Patented June 5, 1917.
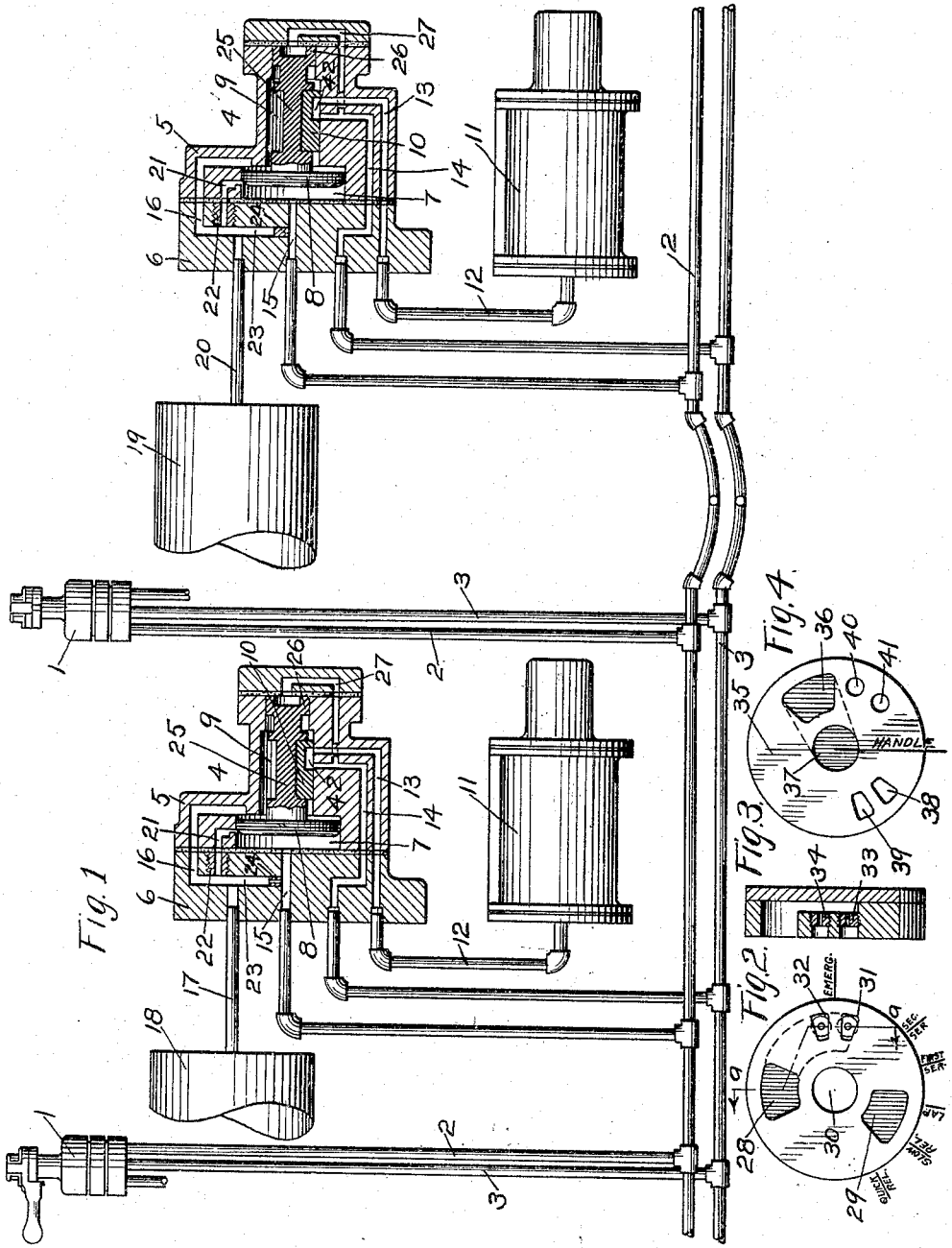

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

STRAIGHT-AIR EMERGENCY-BRAKE.

1,228,498. Specification of Letters Patent. Patented June 5, 1917.

Application filed February 17, 1915. Serial No. 8,839.

*To all whom it may concern:*

Be it known that I, WALTER V. TURNER, a citizen of the United States, residing at Edgewood, in the county of Allegheny and State of Pennsylvania, have invented new and useful Improvements in Straight-Air Emergency-Brakes, of which the following is a specification.

This invention relates to fluid pressure brakes, and more particularly to that type known as the straight air emergency brake.

In order to provide a simple and inexpensive equipment, it has been proposed to employ only two pipes, a straight air pipe and an emergency pipe, there being no direct pipe connection from the main reservoir to the brake valve, since the emergency pipe is designed to serve as the brake valve supply pipe as well as the ordinary emergency pipe.

Brake equipment of the above character are covered by my prior Patents No. 1,099,905, dated June 9, 1914, and No. 1,120,765, dated December 15, 1914, and the present application is in the nature of an improvement on the constructions disclosed in these patents, the general object being to provide an equipment of maximum efficiency and reliability when used either for one or for two car service and which will operate satisfactorily with various sized brake cylinders.

In the two pipe system, fluid under pressure for straight air operation is supplied from the emergency pipe and if the passage from the brake valve to the straight air pipe be of greater area than the passage through which fluid is supplied from the main reservoir to the emergency pipe, it is possible to reduce the emergency pipe pressure by operation of the brake valve at a greater rate than fluid is supplied to the emergency pipe and this is liable to cause the movement of the emergency valve so as to produce an emergency application of the brakes.

According to my invention, choke plugs are provided in the brake valve for limiting the rate of flow from the emergency pipe to the straight air pipe, the choke plugs employed being provided with restricted passages to correspond with the particular volumes to be handled. In addition, there are two straight air service positions, one for single car service and the other for two car service, so as to provide for the different brake cylinder volumes to be handled.

Another feature of my invention consists in so designing the emergency valve that choke plugs with various sized openings may be inserted in the charging and equalizing passages so that the rate of flow may be regulated to suit the requirements of the equipment. For this purpose the emergency valve device is provided with a removable cap having passages for establishing communication through the equalizing and charging passages and so arranged that the choke plugs may be inserted in the passages, having openings to correspond with the requirements of the service in which the equipment is employed.

In the accompanying drawing; Figure 1 is a diagrammatic view of brake equipments for a motor and trailer car coupled together and embodying my invention; Fig. 2 a plan view of the valve seat of the brake valve; Fig. 3 a section on line *a—a* of Fig. 2; and Fig. 4 a face view of the rotary valve.

According to Fig. 1 of the drawing, the brake equipment for the motor car may comprise a brake valve 1 at each end of the car, having connection with emergency pipe 2 and straight air pipe 3, said pipes leading to an emergency valve device 4. The emergency valve device may comprise a main body 5 having a cap 6 arranged for all pipe connections to the emergency valve. Within the body 5 is a piston chamber 7 containing a piston 8, and a valve chamber 9 containing a slide valve 10 adapted to be operated by the piston 8.

Brake cylinder 11 is connected by pipe 12 to passage 13 leading to the seat of slide valve 10, and straight air pipe 3 is connected to passage 14 also leading to the seat of the slide valve, the emergency pipe 2 being connected to a passage 15 which leads to piston chamber 7. A passage 16 leads to valve chamber 9 and on the motor car is connected by pipe 17 to main reservoir 18 while on the trailer car the auxiliary reservoir 19 is connected by pipe 20 to said passage.

A passage 21, having one or more openings into the piston chamber 7, communicates with the passage 16, and in the cap 6 this passage contains a removable choke plug 22.

A branch passage 23 also connects the passage 16 with passage 15 and contains a choke plug 24, which on the motor car has a restricted passage, but on the trailer car is blanked.

The piston stem 25 of piston 8 carries a small piston head 26 at its inner end and a passage 27 leads from the outer face of said piston head to the straight air passage 14.

On the motor car, the plug 24 has a restricted passage to permit equalization of fluid from the main reservoir into the emergency pipe in the emergency position of the emergency valve, so that the brakes may be released, while on the trailer car the plug 24 entirely closes communication through passage 23, so as to prevent back flow in emergency position from the auxiliary reservoir and the brake cylinder to the emergency pipe.

In the brake valve, the rotary valve seat is preferably arranged as shown in Fig. 2 of the drawing, with a port 28, leading to the straight air pipe 3, port 29, leading to the emergency pipe 2, atmospheric exhaust port 30 and first and second service positions ports 31 and 32 which open to the straight air port 28 through a cavity in the valve seat. Removable choke plugs 33 and 34 are provided for regulating the rate of flow through the respective service ports 31 and 32.

The rotary valve 35, the face of which is shown in Fig. 4, has a port 36 connected by a cavity in the valve with a central port 37 adapted to constantly register with exhaust port 30 in the seat. The valve also has through ports 38 and 39 and through ports 40 and 41.

In operation, with the brake valve in quick release position on the operating end of the car and the other brake valve in lap position, the straight air pipe is connected through port 28, port 36, and port 37 with exhaust port 30 and the emergency pipe port 29 is open to through port 38 in the rotary valve, so that fluid from the emergency pipe can flow into the rotary valve chamber, all other ports being blanked.

On the motor car, fluid from the main reservoir 18 flows through pipe 17 and passage 21 to the piston chamber 7 of the emergency valve device 4, if the piston 8 is in release position, and fluid also flows through passage 23 and the choke plug 24 to the passage 15, so that the emergency pipe is charged with fluid under pressure from the main reservoir, and on the trailer car fluid flows from the emergency pipe 2 to piston chamber 7 and thence through passages 21 and 16 to the auxiliary reservoir 19 and valve chamber 9. If there is no trailer car and it is desired to effect an ordinary straight air service application of the brakes, the brake valve handle is turned to the first service position, in which the port 39 registers with port 31 and port 41 registers with emergency pipe port 29. Fluid under pressure will then be supplied from the emergency pipe through port 29 and port 41 to the rotary valve chamber and thence flows through port 39 and port 31 to the straight air port 28 and the straight air pipe 3. From the straight air pipe, fluid flows through passage 14, cavity 42, and passage 13 in the emergency valve device to the brake cylinder 11. It will now be seen that the rate of flow to the brake cylinder is controlled by the choke plug 33 in the first service position port and by providing the proper sized restricted port therein, the flow may be maintained at a point not to exceed the capacity of the supply ports in the emergency valve through which fluid is supplied from the main reservoir to the emergency pipe, so that the emergency pipe pressure can not be reduced sufficiently in straight air operation to cause the accidental movement of the emergency valve device.

If a trailer car is attached to the motor car, then a straight air application is effected by turning the brake valve handle to the second service position, in which ports 38 and 39 register with ports 31 and 32 and ports 40 and 41 register with port 29. Fluid supplied from the emergency pipe to the rotary valve chamber will now flow through both ports 31 and 32 and the respective choke plugs 33 and 34 to the straight air pipe and thence to the brake cylinders on both the motor and trailer cars.

While there will now be a greater rate of flow from the emergency pipe to the straight air pipe, the increased tendency to reduce the emergency pipe pressure is compensated for by the back flow of fluid from the auxiliary reservoir 19 on the trailer car to the emergency pipe.

An emergency application of the brakes takes place upon a sudden reduction in emergency pipe pressure due either to a break-in-two or to the movement of the brake valve handle to emergency position, the large vent port 36 in the rotary valve being adapted to register with the emergency pipe port 29 in emergency position, so that the desired sudden reduction in emergency pipe pressure can be obtained. Upon a sudden reduction in emergency pipe pressure, the emergency valve pistons 8 are shifted to emergency position, in which the valve chamber 9 is opened to the brake cylinder passage 13. Fluid from the main reservoir 18 on the motor car and from the auxiliary reservoir 19 on the trailer car is then supplied to the respective brake cylinders.

The brakes may be released after an emergency application by throwing the brake valve to release position, and when the break in the emergency pipe is closed, the emergency pipe pressure will be built up by flow from the main reservoir on the motor car through the restricted port in the choke plug 24 to the emergency pipe. The small piston head 26 is now subject to atmospheric pressure, since the straight air pipe is connected to the atmosphere in the release position of the brake valve, so that somewhat before the emergency pipe pressure has become fully equalized with the pressure on the valve chamber side of the emergency piston 8, the balance of pressures will be such as to effect the movement of the emergency pistons to release position.

As the plug 24 in passage 23 of the emergency valve device on the trailer car closes said passage, there will be no back flow from the auxiliary reservoir and the brake cylinder in emergency position to the emergency pipe. On the motor car, fluid can flow through the restricted port of the choke plug 24 to the emergency pipe, but this will not do any harm, since the main reservoir pressure can be maintained against such leakage by the usual operation of the compressor.

Having now described my invention, what I claim as new and desire to secure by Letters Patent, is:—

1. In a straight air emergency brake, the combination with a source of fluid under pressure and an emergency brake pipe, of an emergency valve device having a piston and a passage normally providing communication from said source to the emergency brake pipe and adapted to be closed by said piston upon movement of the emergency valve device to effect an application of the brakes and a removable choke plug in said passage having a restricted passage for regulating the rate of flow between said source and the emergency brake pipe.

2. In a straight air emergency brake, the combination with a source of fluid under pressure and an emergency brake pipe, of an emergency valve device having a passage constantly providing communication from the source to the emergency pipe independently of the moving parts of the emergency valve device and containing a removable choke plug having a restricted passage for controlling the rate of flow from the source of pressure to the emergency pipe.

3. In a straight air emergency brake, the combination with a source of fluid under pressure and an emergency brake pipe, of an emergency valve device having a charging passage normally providing communication from the source of pressure to the emergency pipe and adapted to be closed upon movement of the emergency valve device to effect an application of the brakes and an equalizing passage constantly providing communication from the source of pressure to the emergency pipe, each passage having a choke plug for regulating the rate of flow between the source of pressure and the emergency pipe.

4. In a straight air emergency brake, the combination with a straight air pipe and an emergency brake pipe, of a brake valve adapted in service position to connect the emergency brake pipe with the straight air pipe and provided with a removable choke plug for regulating the rate of flow from the emergency brake pipe to the straight air pipe.

5. In a straight air emergency brake, the combination with a straight air pipe and an emergency brake pipe, of a brake valve having two service positions in which fluid is supplied from the emergency brake pipe to the straight air pipe and choke plugs for regulating the rate of flow in said positions.

6. In a straight air emergency brake, the combination with a straight air pipe, an emergency brake pipe, a source of fluid under pressure, a brake valve, and an emergency valve device, of a removable choke plug associated with the emergency valve device for regulating the flow from the source of pressure to the emergency brake pipe and a removable choke plug associated with the brake valve for regulating the flow from the emergency brake pipe to the straight air pipe.

7. In a straight air emergency brake, the combination with a source of fluid under pressure and an emergency brake pipe, of an emergency valve device having a cap containing a passage constantly providing communication from said source of pressure to the emergency brake pipe, said passage having a removable choke plug provided with a restricted passage for regulating the flow from said source to the emergency pipe.

8. In a straight air emergency brake, the combination with a source of fluid under pressure and an emergency brake pipe, of an emergency valve device having two passages providing communication between the source of pressure and the emergency brake pipe, one constantly open and the other adapted to be closed upon applying the brakes in emergency and a choke plug in each passage for regulating the rate of flow therethrough.

9. In a straight air emergency brake, the combination with a straight air pipe and an emergency brake pipe, of a brake valve having two service positions for supplying fluid from the emergency pipe to the straight air pipe at different rates and an emergency position in which the emergency brake pipe is connected to the atmosphere through a large opening.

In testimony whereof I have hereunto set my hand.

WALTER V. TURNER.

Witnesses:
A. M. CLEMENTS,
BARBARA HERBERT.

Copies of this patent may be obtained for five cents each, by addressing the "Commissioner of Patents, Washington, D. C."